US011151390B1

(12) United States Patent
Henon et al.

(10) Patent No.: US 11,151,390 B1
(45) Date of Patent: Oct. 19, 2021

(54) SELF-CORRECTING FACE DETECTION PIPELINE-BASED METHOD AND APPARATUS FOR CENSUSING A CROWD

(71) Applicant: ISM Connect, Doylestown, PA (US)

(72) Inventors: Yann Henon, Doylestown, PA (US); Gennady Livitz, Doylestown, PA (US); Samson Timoner, Doylestown, PA (US)

(73) Assignee: ISM CONNECT, LLC, Doylestown, PA (US)

( * ) Notice: Subject to any disclaimer, the term of this patent is extended or adjusted under 35 U.S.C. 154(b) by 35 days.

(21) Appl. No.: 16/880,467

(22) Filed: May 21, 2020

(51) Int. Cl.
*G06K 9/00* (2006.01)

(52) U.S. Cl.
CPC ..... *G06K 9/00778* (2013.01); *G06K 9/00288* (2013.01); *G06K 9/00684* (2013.01)

(58) Field of Classification Search
CPC ........... G06Q 30/0251; G06Q 30/0269; G06K 9/00281; G06K 9/6262; G06K 9/00724
See application file for complete search history.

(56) References Cited

U.S. PATENT DOCUMENTS

| | | | |
|---|---|---|---|
| 6,792,618 B1 * | 9/2004 | Bendinelli | H04N 7/17318 348/E7.071 |
| 7,403,920 B2 * | 7/2008 | Nishikiori | G06Q 40/04 705/37 |
| 8,154,615 B2 * | 4/2012 | Fedorovskaya | G06K 9/4671 348/222.1 |
| 8,448,056 B2 * | 5/2013 | Pulsipher | G06T 7/70 714/819 |
| 9,412,180 B2 * | 8/2016 | Ono | G06T 7/136 |
| 9,672,535 B2 * | 6/2017 | Higgins | G06K 9/00281 |
| 9,691,074 B2 * | 6/2017 | Fan | G06Q 30/0242 |
| 2006/0044446 A1 | 3/2006 | Porter et al. | |
| 2009/0080715 A1 | 3/2009 | van Beek et al. | |
| 2013/0236072 A1 | 4/2013 | Sun | |
| 2014/0337066 A1 | 7/2014 | Kephart | |
| 2016/0063316 A1 | 3/2016 | Lee et al. | |
| 2018/0027272 A1 | 1/2018 | Raj et al. | |
| 2018/0032796 A1 | 2/2018 | Kuharenko et al. | |
| 2019/0005310 A1 | 1/2019 | Kim | |
| 2020/0257889 A1 | 8/2020 | Merkel et al. | |

* cited by examiner

*Primary Examiner* — Yosef Kassa
(74) *Attorney, Agent, or Firm* — Davis Malm D'Agostine, P.C.; David J. Powsner

(57) ABSTRACT

Aspects of the invention provide a vision pipeline-based method of censusing a crowd that includes presenting content on an outdoor digital display or other content player (e.g., a loudspeaker) and capturing with a video camera or other image acquisition device frames or other time-wise succession of images of a scene in the field of view or otherwise in the vicinity of the display/player. First and second people detectors (both, for example, face detectors) are used to determine respective counts of persons in the scene. Estimated viewing statistics, generated with a detection pipeline that includes the first people detector and a tracker, include at least one of (i) a number of persons in the scene that viewed the content on the player, and (ii) for at least one of those persons, a duration during which he/she was in the scene and/or looking toward the player. Corrected viewing statistics, generated as a function of the estimated viewing statistics and a difference between the counts determined by each of the first and second people detectors, are used to select or alter content presented on the player.

16 Claims, 1 Drawing Sheet

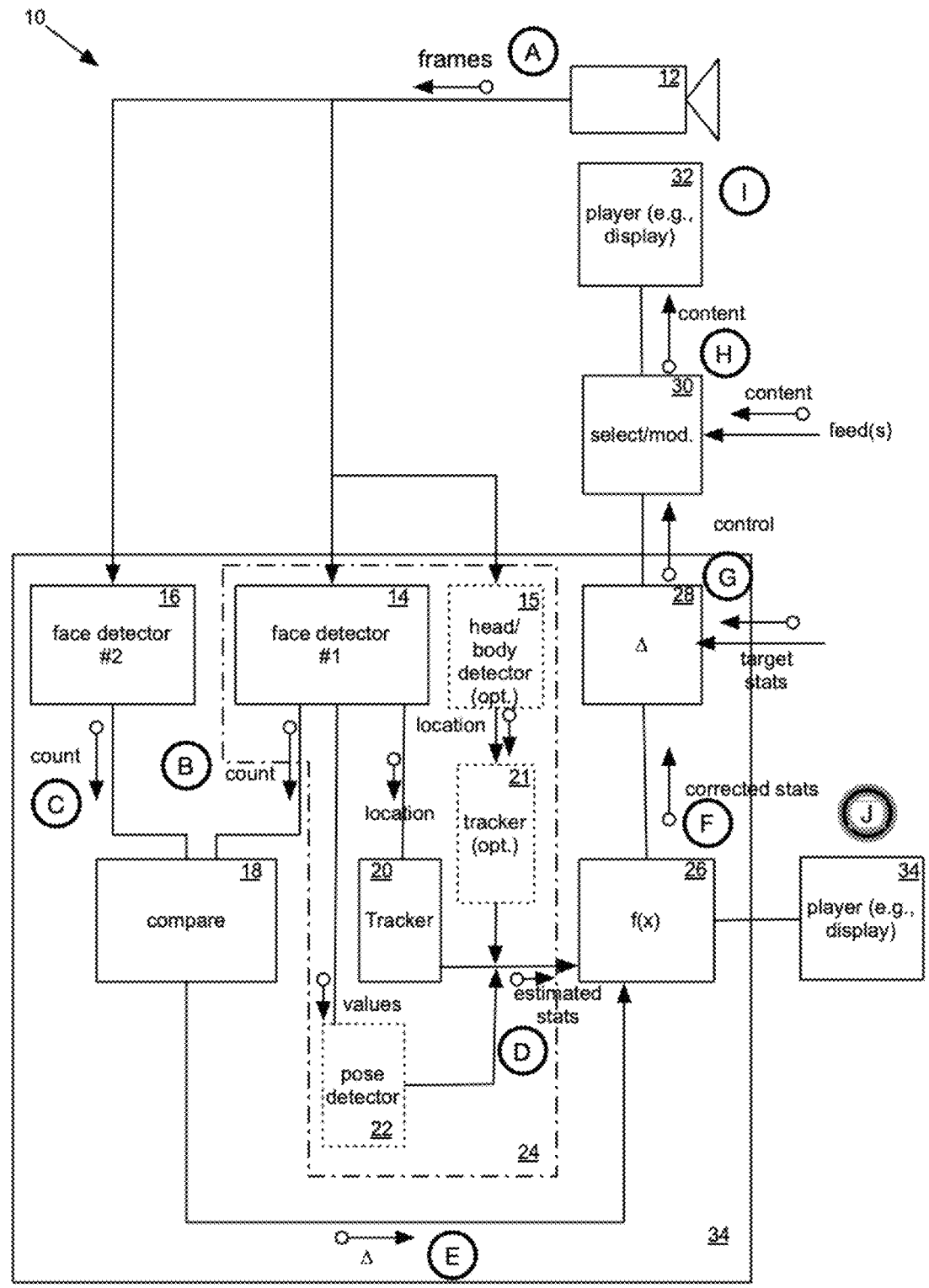

SELF-CORRECTING FACE DETECTION PIPELINE-BASED METHOD AND APPARATUS FOR CENSUSING A CROWD

REFERENCE TO RELATED APPLICATIONS

This application is related to commonly assigned U.S. patent application Ser. No. 16/679,021, filed Nov. 8, 2019, entitled SYSTEM AND METHOD FOR FACIAL RECOGNITION ACCURACY, and to commonly assigned U.S. patent application Ser. No. 16/409,422, filed May 10, 2019, entitled DIGITAL DATA SYSTEMS AND METHODS USING FACIAL RECOGNITION, the teachings of all of which applications are incorporated herein by reference.

BACKGROUND OF THE INVENTION

The invention relates to digital data processing and, more particularly, to counting and monitoring persons at a venue. It has application in security systems and digital (or other) content generation systems, among others.

A problem for security personnel and organizers of events at stadiums, parks, plazas, and other forums that support the gathering or passage of people is counting their numbers and determining what activities they are engaged in—for example, whether they are paying attention to a specific event, looking at signage or otherwise. An extraordinarily large assemblage outside a sports stadium could foretell trouble if its numbers are high and the attention of most are focused on the gate. A smaller number milling about and glancing in all directions might suggest something else entirely.

Security personnel are trained to pay attention to these sorts of things and to put up control barriers, redirect crowds and so forth before its onset. Staffing can be expensive, though, and is typically not viewed as being justified at every event. And, while the nature of some events, like high-profile sports matches, political rallies, and so forth, clearly warrant advance staffing, other events may not—until it's too late.

The prior art includes facial recognition systems capable of identifying individuals in still images or video streams. Reliably detecting and recognizing faces, though, requires expensive hardware and processing resources. As a result, while facial recognition systems can be useful in certain applications—such as access control systems, which are typically called upon to analyze images of only one or two persons at a time—they can be of limited utility in crowd control situations.

The prior art also includes object recognition systems for identifying undifferentiated objects of specified shape. These can be adapted to identifying human bodies in a scene captured by camera, though, they have limited ability to detect movement of individuals across video frames and, hence, can miss trends in crowd activity that might serve as advance warning of trouble, or the cessation of same. Although more advanced body recognition systems overcome these shortcomings, they too can require expensive hardware and processing resources.

In view of the foregoing, an object of the invention is to provide improved systems, apparatus and methods for digital data processing.

A further object of the invention is to provide such systems, apparatus and methods as facilitate counting people at a venue.

Still further objects of the invention is to provide such systems, apparatus and methods as facilitate monitoring at least selected activities of persons at a venue.

Yet still further objects of the invention are to provide such systems, apparatus and methods as can be implemented at low-cost and, yet, are capable of executing in real time.

SUMMARY OF THE INVENTION

The foregoing are among the objects obtained by the invention which provides, in some aspects, a face detection pipeline-based method of censusing a crowd that includes presenting content on an outdoor digital display or other content player (e.g., a loudspeaker) and capturing with a video camera or other image acquisition device frames or other time-wise succession of images of a scene in the field of view or otherwise in the vicinity of the display/player.

The method further includes using a first people detector and a second people detector (both, for example, face detectors) to determine substantially concurrently with one another first and second counts, respectively, of persons in the scene. Estimated viewing statistics are generated with a face detection pipeline that includes both the first people detector and a tracker, where those estimated statistics include at least one of (i) a number of persons in the scene that viewed the content on the player, and (ii) for at least one of those persons, a duration during which he/she was in the scene and/or looking toward the player.

Corrected viewing statistics are, according to the method, generated as a function of the estimated viewing statistics and a difference between the counts determined by each of the first and second people detectors. That difference, which in some aspects of the invention can be based on an additive difference, in other aspects of invention is a multiplicative difference, or ratio.

In further aspects, the invention provides a method, e.g., as described above, including the step of selecting or altering content for presentation on the player as a function of the corrected viewing statistics. Thus, for example, in some aspects, the invention provides a method, e.g., as described above, including selecting among multiple digital streams for presentation on the player as a function of the corrected viewing statistics. In embodiments where the player is a digital display device, this aspect of the method can include identifying a video stream for presentation on that display device by selecting among multiple digital video streams.

Related aspects of the invention provide a method, e.g., as described above, including displaying the corrected viewing statistics on a digital display device. That display device may be the same as or separate and apart from the content player.

Further related aspects of the invention provide a method, e.g., as described above, comprising displaying the corrected viewing statistics on a digital display device.

Other aspects of the invention provide a method, e.g., as described above, comprising using the tracker to associate one or more faces detected by the first people detector with a same person over multiple frames captured by the video camera.

Still further aspects of the invention provide a method, e.g., as described above, that includes processing a majority of frames captured by the video camera with the face detection pipeline to determine the estimated viewing statistics, yet, processing less than a majority of frames captured by the video camera with the second people detector in order to determine the second count.

Yet still further aspects of the invention provide a method, e.g., as described above, in which the first and second people detectors are used to process different frames captured by the video camera in order to determine the first and second counts, respectively.

Still yet further aspects of the invention provide a method, e.g., as described above, that includes processing a down-sampled image captured by the video camera using the first people detector to determine the first count, yet, processing a full-resolution image captured by the video camera using the second people detector to determine the second account.

Other aspects of the invention provide a method, e.g., as described above, that includes low-pass filtering the corrected viewing statistics to reduce noise.

The invention comprises, in still other aspects, a method, e.g. as described above, including using a facial pose detector in the face detection pipeline to detect if a person in the scene had his/her gaze directed toward the player.

Yet other aspects of the invention provide a method, e.g., as described above, in which the first and second people detectors are executed on different cores of the same central processing unit.

These and other aspects of the invention are evident in the description, drawings and claims hereof.

BRIEF DESCRIPTION OF THE DRAWINGS

A more complete understanding of the invention may be attained by reference to the drawings, in which:

FIG. 1 depicts a system and method according to the invention for censusing a crowd.

DETAILED DESCRIPTION OF THE ILLUSTRATED EMBODIMENT

Architecture

FIG. 1 depicts a system, apparatus and method according to the invention for censusing a crowd. The system 10 includes an acquisition device 12 (here, a video camera) that is coupled to a first people detector 14 and a second people detector 16, each of which is in turn coupled to a comparator 18. People detector 14 is additionally coupled to a tracker 20 and, in turn, optionally, a pose detector 22, while optional body detector 15 is coupled to an optional tracker 21, all collectively forming a people detection pipeline 24. Tracker 20, optional tracker 21 and optional pose detector 22 are coupled to correction logic 26 which, in turn, is coupled to control unit 28 and, in turn, to switch 30, which drives a content to display 32. In some embodiments, correction logic 26 can drive output to display 34 instead or in addition to control 28.

In the illustrated embodiment, elements 16-28 are implemented in software that executes on a common digital data processor 34, which can be a workstation, desktop, laptop, micro, embedded or other general- or special-purpose computing device of the type commercially available in the marketplace or otherwise known in the art, as adapted in accord with the teachings hereof. Other embodiments may vary in one or more of these regards. Thus, for example, elements 16-28 may execute in distributed fashion across multiple devices be they general-purpose computers, special-purpose logic, or otherwise, as is within the ken of those skilled in the art in view of the teachings hereof.

Coupling between such multiple devices, in embodiments that utilize them can be via local area network (LAN), Internet, and/or other communications media (wireless or wired) of the type commercially available in the marketplace or otherwise known in the art, as adapted in accord with the teachings hereof. This is likewise true of coupling between video camera 12 and digital data processor 34, as well as between control unit 28 and switch 30. Player 32 and display 34 can be coupled to switch 30 and logic 26 in the conventional manner known in the art, as adapted in accord with the teachings hereof.

Capturing Images of the Scene

Acquisition device 12 is a video camera or other image acquisition device (hereinafter, "video camera") that captures time-wise-successive images ("frames") of a scene. See step (A). In the illustrated embodiment, that scene is in a vicinity of the player 32, and video camera 12 is positioned so that when persons in that vicinity are turned toward the player 32 they are facing both it and the video 12. In other embodiments, the scene is in vicinity of a sports match, a play, a performer, or other person, place or thing of potential interest to persons nearby.

Camera 12 can be a conventional security camera of the type commercially available in the marketplace or otherwise known in the art, as adapted in accord with the teachings hereof, though, in other embodiments other image acquisition devices suitable for acquiring frames of a scene may be used instead. And, although, only one device 12 is shown in the drawing, it is within the ken of those skilled in the art to use multiple such devices in view of the teachings hereof.

Dual Comparative People Detectors

The illustrated embodiment utilizes, as people detectors, two face detectors 14, 16 of differing capabilities and/or operational parameters to concurrently count faces in frames received from the video camera 12. See steps (B) and (C). Differences in the counts of faces returned by them are used to correct an estimate of crowd statistics returned by face detection pipeline 24 of which one of those detectors forms a part.

Face detectors 14, 16 are conventional such units commercially available in the marketplace or otherwise known in the art, as adapted in accord with the teachings hereof, suitable for detecting faces in frames of the scene received from the video camera 12. The detectors run independently of one another and, indeed, in some embodiments run on different cores of the central processing unit (not shown) of digital data processor 34. Each detector 14, 16 detects faces in frames received from video camera 12, gives each face a unique ID ("faceID") and isolates the face image from the rest of the frame, all per convention in the art as adapted in accord with the teachings hereof.

Each detector 14, 16 generates a count of unique faces detected by that respective detector in the scene during a time interval common to the detectors 14, 16 and passes that to comparator 18. Each detector 14, 16 can make its respective count determination by sampling a frame during the interval and totaling the number of unique faces found by it in that frame; where multiple frames are sampled by either detector during that interval, the count for that detector can be an average, minimum, maximum or other measure of totals as among those frames.

The interval, which is selected empirically based, for example, on the size of the scene, the expected number of persons in it, their expected velocity (peak, average or otherwise) with respect to the scene, and so forth, all as is within the ken of those skilled in the art in view of the teachings hereof, can be in the range of 1-10 seconds for a walking crowd, shorter for a fast moving crowd and still longer for a fully stationary crowd, all by way of example.

As noted, face detectors 14, 16 are of the conventional variety known in the art, as adapted in accord with the teachings hereof. For example, they can utilize well known face detection algorithms such as MTCNN (Multi-task Cascaded Convolutial Neural Network) or RetinaFace. They can both use the same algorithm, but have different parameters, such as network architectures (e.g., Resnet 50 vs MobileNet, which typically trade off quality for compute required).

In the illustrated embodiment, the detectors differ from one another. Thus, for example, detector 14, which may be based on the retinaface algorithm with a MobileNet architecture can be selected for its strengths in having low compute needs and having an approximately constant run time, independent of the number of images in the scene, while detector 16, on the other hand, which may be based on the retinaface using ResNet 100, which requires much more compute. Other embodiments may differ in these regards and, indeed, may utilize identical algorithms albeit differing operational parameters for the respective detectors, as is within the ken of those skilled in the art in view of the teachings hereof.

A further appreciation of the choice of face detectors comes from the limitations of the tracker 20. Most trackers are ineffective if the frame rate is too low. If detector 14 requires too much time to execute, and it forces the system to lower frame rate, tracker 20 may become ineffective. Thus, in some embodiments, the limitations of tracker 20 dictate that detector 14 be chosen to be fast enough to allow a sufficiently high frame rate. Conversely, because detector 16 does not provide input to tracker 20, it may be selected without the limitations of tracker 20.

It will be appreciated by those skilled in the state of the art, that face detector 14 and detector 16 can be replaced by other "people detectors," e.g., head detectors, body detectors or other detectors that allow the counting of people. The goal is to have two estimates of the number of people in the scene, e.g., a first that is utilized as part of a more resource-intensive detection pipeline and a second that is not, and to use the differences in their outputs to drive a correction that enables a better prediction the actual number of people in the scene, all as will be more fully evident in the discussion below.

It will be appreciated by those skilled in the state of the art that detector 16 could be replaced by multiple detectors so that more than two measurements of the number of people in the same scene are collected. In this case, the modules below Estimated Statistics and Correction of Estimated Statistics could be expanded to make predictions based on more than 2 measurements.

People Detection Pipeline

Along with tracker 20, optional pose detector 22, optional head/body detector 15 and optional tracker 21, detector 14 of the illustrated embodiment forms detection pipeline 24 that generates estimated statistics regarding persons whose images are captured in the frames from the video camera 12.

Tracker 20 is a conventional such logic unit commercially available in the marketplace or otherwise known in the art, as adapted in accord with the teachings hereof, suitable for tracking each face identified by detector 14 from frame to frame in the video stream during an interval. For example, tracker 20 can be a Kerrnelized Correlation Filter tracker (KCF) or a Kalman filter based tracker. The tracker associated detections from detector 14 from one frame to another, forming a track of the motion of the detected individual in time.

Optional pose detector 22 is a conventional such logic unit commercially available in the marketplace or otherwise known in the art, as adapted in accord with the teachings hereof, suitable for determining the pose of each face identified by face detector 14 and tracked by trackers 20 during an interval. In the illustrated embodiment, the pose detector is utilized to insure that detected faces are truly aimed/directed to the player 32 (or other person, place or thing of interest) and video camera 12. Many pose detectors known to those skilled in the art are suitable for this purpose, including FacePoseNet (International Conference on Computer Vision, 2017) which takes as input a cropped face and finds the rotations of the head using a standard convolution neural network. An alternative method is to have the detector 14 also detect fiducial points on the face, such as the tip of the nose, the centers of the eyes and the tips of the mouth. Detectors such as MTCNN can produce those locations. From there, a $3d$ model of an average face can be fit to the measured landmarks, typically producing the rotation, translation and scale of the same landmarks from the 3d model.

Optional head or body detector 15 (hereinafter, "body detector") comprises a conventional such logic unit commercially available in the marketplace or otherwise known in the art, as adapted in accord with the teachings hereof. An example of such a body detector is OpenPose (Cao et al, IEEE PAMI 2019) which is known in the art. Other body detectors may simply bounding box around the entire body, or segment out parts of the body on a pixel by pixel basis. Like face detectors 14,16, body detector 15 detects human bodies in frames received from video camera 12, gives each a unique ID and isolates the body image from the rest of the frame, all per convention in the art as adapted in accord with the teachings hereof.

Optional tracker 21 is constructed and operated like tracker 20, although tracker 21 is adapted to for tracking each body identified by detector 15 from frame to frame in the video stream during an interval.

Estimated Statistics

By tracking both faces and bodies during an interval, pipeline 24 generates estimated statistics regarding persons in the scene during each of the aforesaid intervals and, more specifically, generate statistics that include at least one of (i) a number of persons in the scene that viewed the content on the player 32 (or who otherwise directed his/her attention to the person, place or thing of interest), i.e., whose faces were directed toward the player 32, or other person, place or thing of interest (and, in the illustrated embodiment, also toward the video camera 12), (ii) for at least one of those persons, a duration during which he/she was in the scene and/or looking toward the player or other person, place or thing of interest.

See step (D).

To that end, the number of persons in the scene that viewed the content on the player 32 or who otherwise directed his/her attention to the person, place or thing of interest (hereinafter, for simplicity, collectively referred to by the phrase "viewed the content player 32" or the like) is a count of the unique faces detected by detector 14 and tracked by the tracker 20 during the interval. And the duration during which a person in the scene was looking toward the player 32 is a count of the number of frames during which that person's face was detected, multiplied by the time-wise length of each frame. In embodiments that employ pose detector 22, it can be employed to improve the estimate of the number of persons in the scene that viewed the content on the player 32 by limiting the count of unique faces detected by detector 14 and tracked by the tracker 20 to those whose faces are fully "front on" to the player 32

(and camera 12) and, thus, most likely to be truly looking at or otherwise paying attention to it.

In embodiments that employ the optional body detector 15 and tracker 21 in the pipeline 24, the duration during which the person was in the scene is determined is a count of the number of frames during which that person's face was detected, multiplied by the time-wise length of each frame. To this end, a correlation between faces ID'd by the detector 14 and tracked by the tracker 20 with bodies ID'd by detector 15 and tracked by tracker 21 is determined by a process of matching the locations of faces ID'd by the detector 14 and tracked by tracker 20 with those of the bodies ID'd by tracker 15 and tracked by tracker 21.

Correction of Estimated Statistics

The estimated statistics generated by the pipeline 24 of the illustrated embodiment are corrected based on differences between the counts of unique faces detected by the respective detectors 14, 16 in the scene during a common time interval. To that end, as noted above, the detectors are of differing capabilities, e.g., as a result of their being based on different respective algorithms. Alternatively, or in addition, they may operate under differing parameters.

In that latter regard, for example, regardless of whether utilizing the same algorithm as its counterpart 16, detector 14 may be parameterized or otherwise operated so as to process all or a majority of frames captured by the video camera using the automated detection pipeline to determine the estimated viewing statistics. Detector 16, on the other hand, may be parameterized or otherwise operated so as to process less than a majority of frames (e.g., 10%-30%, depending on interval size, etc.) captured by the video camera using the second face detector in order to determine the second count. Moreover, in addition to processing differing numbers of frames, the detectors 14, 16 can be parameterized or otherwise operated to process different respective frames during the interval. Thus, by way of non-limiting example, detector 14 can be parameterized and/or operated to process between 6-9 of every 10 frames received from video camera 12, whereas detector 16 can be parameterized/operated to process 1 or more of the remaining frames in each batch of 10 frames. Alternatively, or in addition, the detector 14 and/or pipeline 24 can operated on down-sampled frames from the video camera 12, while detector 16 operates on full-resolution such frames.

In one embodiment, detector 14 processes as many frames as possible. Detector 16 captures a frame periodically timed according to a clock, and is always a frame processed by detector 14. A slight variation of this embodiment is to compare the average of the results of detector 14 on 3 frames processed in order, and have detector 16 examine the middle frame. The comparison between them can be simplified to compare two numbers over time. Without limitation, the periodicity of detector 16 can be chosen to be slightly longer than the time detector 16 needs to process a frame, so that detector 16 does not fall behind. And, therefore detector 16 is chosen to be fast enough so that it is run much more often than the crowd size is expected to change. For example, crowd sizes at American baseball games typically don't change significantly over seconds, but they do over hours. Comparator 18 determines counts generated by detectors 14, 16 to generate a value, A, that represents the differences between them. See step (E). This can be an additive difference, i.e., a result of subtracting one count from the other, though, in the illustrated embodiment A is a multiplicative difference, i.e., a ratio. Other embodiments may generate A in other ways, e.g., logarithmic differences, and so forth.

At instantiation of the comparator 18 is shown in the code below in the module ViewerStatisticalEstimatorBase. In that instantiation, the ratio of the sum of 24 measurements of the number of detections from detectors 14 to the ratio of the sum of 24 measurements of the detections in detector 16, As shown in the drawing, the value A is passed by comparator 18 to correction logic 26, which generates corrected viewing statistics as a function of that value and the estimated viewing statistics received from the face detection pipeline 24. See step (F). To that end, in the illustrated embodiment, logic 26 determines a correction factor based on the value A and multiplies it by each of the estimated statistics received from the pipeline 24 to generate corresponding corrected statistics.

The correction factor can be empirically determined, e.g., actual counts in frames from video 12 with the comparative differences of those returned by detectors 14, 16, or otherwise, as is within the ken of those skilled in the art in view of the teachings hereof. In practice, actual counts can be determined either by having a human operator inspect the video and count faces (e.g., optionally, after using an extremely high fidelity face detector to make a first pass at estimating the count).

The correction factor can be embodied in function logic, stored in a look-up table, or otherwise, again, as is within the ken of those skilled in the art in view of the teachings hereof. In some embodiments, the correction logic 26 utilizes a low pass filter to reduce noise, i.e., to minimize corrections that are statistically insignificant. In this regard, as is within the ken of those skilled in the art, the filter is applied to the correction made to create the corrected viewing statistics, not the viewing statistics themselves. This ensures that the corrections in time to slowly vary, because they are a function of the scene, which we are expected to slowly vary. Though, it might be the case that at any given moment, as well, if more or less people are looking at the video. In the module ViewerStatisticalEstimatorBase below, one can see an example of such a low pass filter.

In step (G), control unit 18 compares the corrected statistics from correction logic 26 with target statistics, e.g., statistics reflecting target values for the number of persons in the scene viewing content on the player 12, the duration during which at least one of those persons was present in the scene and/or was looking toward the player, to generate a control signal, which is applied to selection module 30, in step (H), to select video, audio or other content for presentation by the player 32, which plays that content in step (I). In some embodiments, module 30 modifies an existing content feed in response to the control signal instead of, or in addition to, selecting such a feed. Thus, for example, depending on the value of the control signal, the module can increase the gain of an audio feed or vary the brightness of a video feed (e.g., so that it will be experienced by more persons in the scene), all by way of example. In some embodiments, the system 10 can in addition to, or in lieu of, steps (F)-(H), display the corrected viewing statistics on a player 34. See step (J).

A more complete understanding of the illustrated embodiment may be attained by reference to the code excerpts below, in which construction and operation of the modules shown in FIG. 1 is expressed in the Python programming language and comments embedded therein:

```
from client.pipeline_module import SynchronousPipelineModule
from client.libs.post_service import PostService, ModuleNames
```

```
from core.detector.face_detector_factory import face_de-
    tector_factory,
    FaceDetectorNames
from collections import deque
from typing import Tuple
from core.logger import logger
import numpy as np
from core.tracker.containers import AgeGenderCorrec-
    tions
from abc import abstractmethod
from queue import Queue
class ViewerStatisticalEstimatorBase(SynchronousPipe-
lineModule):
    def_init_(self):
        """
        Module handling statistical estimation of viewer time and
        dwell time multipliers. This module is used to occasionally
        run a higher resolution (slower) detector on the incoming
        frame data. By computing the ratio of detection in the high-
        and low-resolution frames, we can form estimates of how
        well our detector is performing in the current scene. Based
        on ground truth annotations of video data that we performed,
        we can estimate multipliers for the attention and dwell time.
        """
        super( )._init_( )
        self.event_handlers={'estimate_ratio': self.estimate_ra-
            tio}
        #initialize the high res detector
        self.detector=face_detector_factory(FaceDetector-
            Names.mtcnn, use_openvino_if_available=False)
        self.detector.set_scales((1.0,))
        self.detector.set_margin_percentage(0.0)
        self.detector.detect_faces(np.ones((1080, 1920, 3),
            dtype=np.uint8))
        #number of sample counts to store, used to compute the
            ratio of hi-res to
        #low-res detects
        self.num_samples=24
        self.low_res_counts=deque(maxlen=self.num_samples)
        self.high_res_counts=deque(maxlen=self.num_samples)
        #minimum and maximum multipliers. Multiplier can
            never go below 1.
        #We also cap the multiplier due to our
        #lack of data in the high multiplier regime
        self.minimum_multiplier=1.0
        self.maximum_multiplier=10.0
        self.attention_time_multiplier=1.0
        self.dwell_time_multiplier=1.0
        #factors used to compute multipliers, applied as such:
            multiplier(ratio)=#factor*(ratio-1)+1
        self.attention_time_factor=2.63 #estimated from data
        self.dwell_time_factor=2.86 #estimated from data
        self.alpha=0.05 #alpha parameter for the moving average
            calculation
        PostService.register(ModuleNames.ViewerStats, self-
            .input_queue)
    def estimate_ratio(self, data)→None:
        """
        Update the viewer count from the high-res detector
        """
        (frame, low_res_face_count), timestamp=data
        faces=self.detector.detect_faces(frame)
        self.low_res_counts.append(low_res_face_count)
        self.high_res_counts.append(len(faces))
        if sum(self.low_res_counts)>0:
            #compute viewer ratio between high and low res
            ratio=sum(self.high_res_counts)/sum(self.low_res-
                _counts)
            #get multipliers based on that ratio
            attention_time_ratio,
                dwell_time_ratio=self.estimate_multipliers_from_ratio
                (ratio)
            #update the moving average as
                new_value=alpha*measurement+#(1-alpha)*old-
                _value
            self.attention_time_multiplier=\(1.0-self.alpha)*sel-
                f.attention_time_multiplier+
                self.alpha*attention_time_ratio
            self.dwell_time_multiplier=\(1.0-self.alpha)
                *self.dwell_time_multiplier+
                self.alpha*dwell_time_ratio
        elif sum(self.low_res_counts)==0 and sum(self.high_res-
            _counts)==0:
            #if there are no viewers at all, we treat this as a special
                case where the ratio is 1
            self.attention_time_multiplier=\(1.0-self.alpha)*sel-
                f.attention_time_multiplier+self.alpha*1.0
            self.dwell_time_multiplier=\(1.0-self.alpha)
                *self.dwell_time_multiplier+self.alpha*1.0
        else:
            #if there are viewers in the hi res but not the low res,
                we unfortunately cannot
            #estimate the ratio,
            #so we just keep it constant
            logger.info(f"Cannot estimate viewer ratio, no viewers
                in low res counts")
        self.send_multipliers(self.attention_time_multiplier,
            self.dwell_time_multiplier)
    def clamp(self, x: float)→float:
        return min(self.maximum_multiplier, max(self.mini-
            mum_multiplier, x))
    def estimate_multipliers_from_ratio(self, ratio: float)
    →Tuple[float, float]:
        """
        Estimate the multiplier to apply to dwell and attention
            time based on the ratio of
        detects in high
        and low resolution detector
        """
        attention_time_ratio=self.attention_time_factor*(ratio-
            1.0)+1
        dwell_time_ratio=self.dwell_time_factor*(ratio-1.0)+1
        attention_time_ratio=self.clamp(attention_time_ratio)
        dwell_time_ratio=self.clamp(dwell_time_ratio)
        return attention_time_ratio, dwell_time_ratio
    @abstractmethod
    def send_multipliers(self, attention_time_ratio: float,
    dwell_time_ratio: float):
        """
        Send multiplier to dumper
        :param attention_time_ratio:
        :param dwell_time_ratio:
        """
        raise NotImplementedError
class ViewerStatisticalEstimatorToFileDumper(Viewer-
StatisticalEstimatorBase):
    """ This one runs in a single process implementation. """
    def send_multipliers(self, attention_time_ratio: float,
    dwell_time_ratio: float):
        """
        Communicates the multiplier to the dumper
        Send multiplier to dumper
        :param attention_time_ratio:
```

```
:param dwell_time_ratio:
self.send(ModuleNames.AgeGenderDumper, "set_statis-
    tical_corrections",           AgeGenderCorrections
    (attention_time_correction=attention_time_ratio,
    dwell_time_correction=dwell_time_ratio))
class    ViewerStatisticalEstimatorMaster(Synchronous-
PipelineModule):
"""" This one runs in a two process mode in the master
process""""
    def_init_(self, qslave_in, qslave_out):
        super( )._init_( )
        self.event_handlers={'set_statistical_corrections': self-
            .set_statistical_corrections}
        PostService.register(ModuleNames.ViewerStats,
            qslave_in)
        self.input_queue: Queue=qslave_out
        if 'task_done' not in self.input_queue._dict_:
            self.input_queue._dict_['task_done']=lambda: None
    def set_statistical_corrections(self, data):
        self.send(ModuleNames.AgeGenderDumper, 'set_statis-
            tical_corrections', data)
class ViewerStatisticalEstimatorSlave(ViewerStatistical-
EstimatorToFileDumper):
"""" This one runs in a two process mode in the slave
process""""
    def_init_(self, qslave_in, qslave_out):
        super( )._init_( )
        self.input_queue=qslave_in
        if 'task_done' not in self.input_queue._dict_:
            self.input_queue._dict_['task_done']=lambda: None
        self.output_queue=qslave_out
    def send_multipliers(self, attention_time_ratio: float,
dwell_time_ratio: float):
        """"
        Communicates the multiplier to the dumper
        Send multiplier to dumper
        :param attention_time_ratio:
        :param dwell_time_ratio:
        """"
        self.output_queue.put
            ({"set_statistical_corrections":
                AgeGenderCorrections
                    (attention_time_correction=attention_time_ratio,
                    dwell_time_correction=dwell_time_ratio)})
```

Described herein are embodiments of the invention meeting the objects set forth above. It will be appreciated that there are merely examples of the invention and that other embodiments may incorporate changes to those described herein within the ken of those skilled in the art.

In view of the foregoing, what we claim is:

1. A people detection pipeline-based method of censusing a crowd, comprising
    A. presenting content on a player,
    B. capturing, with a video camera or other image acquisition device (collectively, "video camera"), time-wise-successive images ("frames") of a scene in a vicinity of the player,
    C. using a first people detector to determine a first count of persons in the scene,
    D. using a second people detector to determine a second count of persons in the scene, the second people detector determining the second count substantially concurrently with the determination by the first detector of the first count,
    E. generating, with an automated detection pipeline that includes the first people detector and that includes a tracker, estimated viewing statistics that include estimates of at least one of
        (i) a number of persons in the scene that viewed the content on the player,
        (ii) for at least one of those persons, a duration during which he/she was (a) in the scene and (b) looking toward the player,
    F. generating corrected viewing statistics as a function of (i) the estimated viewing statistics, and (ii) a difference between first and second counts.

2. The method of claim 1, comprising the step of
any of selecting or altering the content presented on the player as a function of the corrected viewing statistics.

3. The method of claim 2, comprising selecting among multiple digital streams for presentation on the player as a function of the corrected viewing statistics.

4. The method of claim 3, wherein the player is a digital display device and wherein the step of selecting among multiple digital streams includes selecting among multiple digital video streams.

5. The method of claim 2, comprising displaying the corrected viewing statistics on a digital display device.

6. The method of claim 2, comprising altering a display depicting any of faces and bodies on a digital display device to reflect any of (i) the corrected viewing statistics, and (ii) differences between the corrected viewing statistics and the estimated viewing statistics.

7. The method of claim 1, comprising using a tracker to associate one or more faces detected by the first people detector with a same person over multiple frames.

8. The method of claim 6, wherein
    step (E) includes processing a majority of frames captured by the video camera using the automated detection pipeline to determine the estimated viewing statistics,
    step (D) includes processing less than a majority of frames captured by the video camera using the second people detector in order to determine the second count.

9. The method of claim 1, wherein steps (C) and (D) comprise using the first and second people detectors to process different respective frames captured by the video camera in order to determine the first and second counts, respectively.

10. The method of claim 6, wherein step (E) comprises generating the corrected viewing statistics as a function of a ratio of first and second counts.

11. The method of claim 1, wherein
    step (C) comprises processing a down-sampled image captured by the video camera using the first people detector to determine the first count, and
    step (D) comprise processing a full-resolution image captured by the video camera using the second phase to factor to determine the second account.

12. The method of claim 1, wherein step (E) comprises low pass-filtering adjustments to the estimated viewing statistics in connection with generating the corrected viewing statistics.

13. The method of claim 1, wherein step (E) includes using a facial pose detector in the automated detection pipeline to detect if a person in the scene has his/her gaze directed toward the player.

14. The method of claim 1, comprising executing the first and second people detectors on different cores of a same central processing unit.

15. Apparatus for censusing a crowd, comprising
    A. a content player,

B. a video camera or other image acquisition device (collectively, "video camera") that captures time-wise-successive images ("frames") of a scene in a vicinity of the player,
C. a first people detector that is coupled to the video camera to determine from frames captured thereby a first count of persons in the scene,
D. a second people detector that is coupled to the video camera to determine from frames captured thereby a second count of persons in the scene, the second people detector determining the second count substantially concurrently with the determination by the first detector of the first count,
E. a face detection pipeline that is coupled to the video camera and that includes the first people detector and a tracker, the face detection pipeline estimating from frames captured by the video camera viewing statistics that include estimates of at least one of
  (i) a number of persons in the scene that viewed the content on the player,
  (ii) for at least one of those persons, a duration during which he/she was (a) in the scene and (b) looking toward the player,
E. the apparatus generating corrected viewing statistics as a function of (i) the estimated viewing statistics, and (ii) a difference between first and second counts.

16. A face detection pipeline-based method of censusing a crowd, comprising
    A. capturing, with a video camera or other image acquisition device (collectively, "video camera"), time-wise-successive images ("frames") of a scene,
    B. using a first people detector to determine a first count of persons in the scene,
    C. using a second people detector to determine a second count of persons in the scene, the second people detector determining the second count substantially concurrently with the determination by the first detector of the first count,
    D. generating, with an automated detection pipeline that includes the first people detector and that includes a tracker, estimated viewing statistics that include estimates of at least one of
      (i) a number of persons in the scene that viewed the content on the player,
      (ii) for at least one of those persons, a duration during which he/she was (a) in the scene and (b) looking toward the player,
    E. generating corrected viewing statistics as a function of (i) the estimated viewing statistics, and (ii) a difference between first and second counts.

* * * * *